May 9, 1950 — C. D. SWARTOUT — 2,507,425
DOUBLE BOWL AND COVER
Filed Nov. 30, 1945
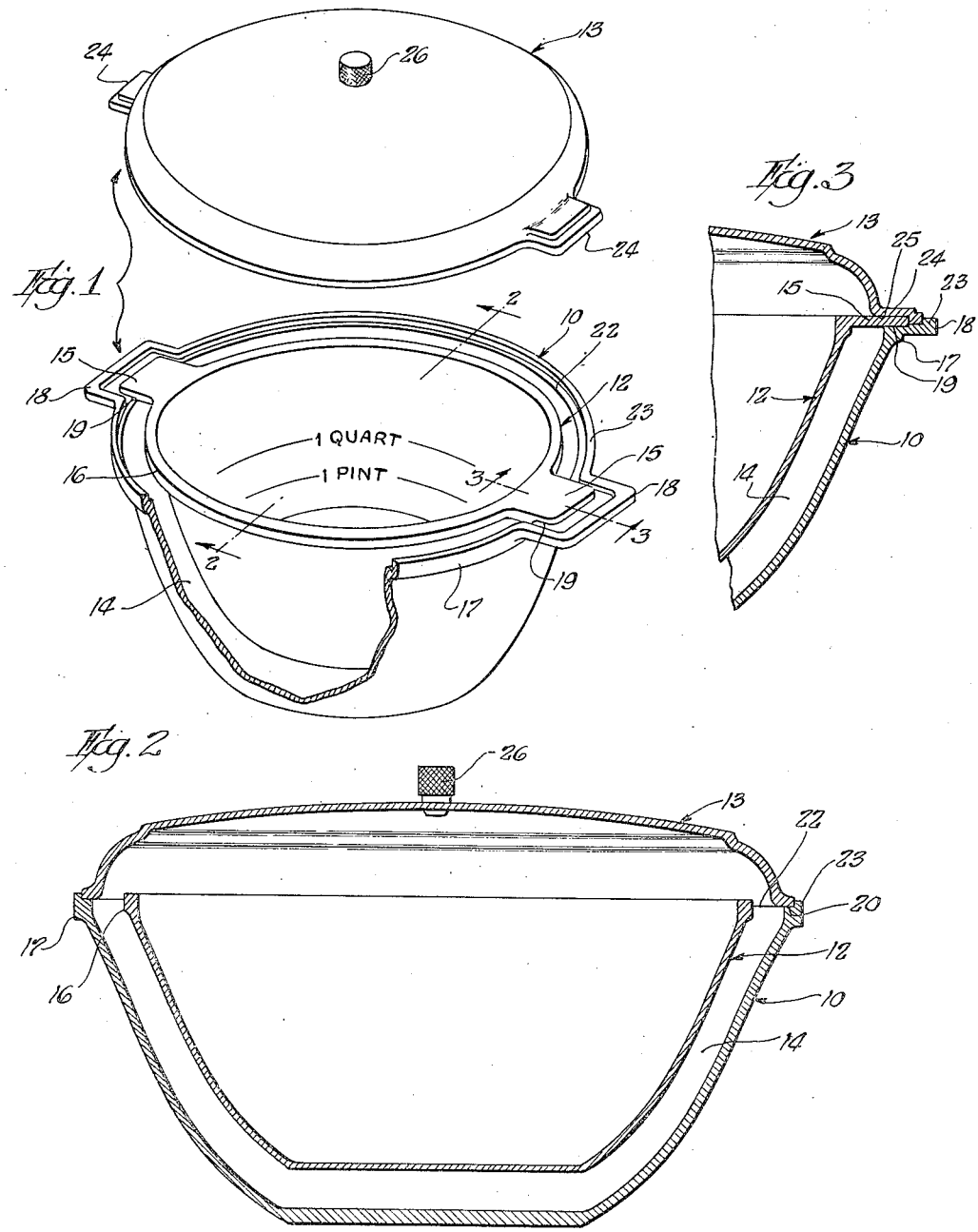
Inventor
Clotilde D. Swartout
By Albert G. McCaleb
Atty Patented May 9, 1950

2,507,425

UNITED STATES PATENT OFFICE 2,507,425

DOUBLE BOWL AND COVER

Clotilde D. Swartout, North Muskegon, Mich.

Application November 30, 1945, Serial No. 632,046

3 Claims. (Cl. 220—9)

My present invention relates to double bowl and cover sets, and more particularly to such sets adapted to a wide variety of uses as kitchen ware including the raising of yeast dough and the like.

My present invention relates to double bowl and cover sets, and more particularly to such sets adapted to a wide variety of uses as kitchen ware including the raising of yeast dough and the like.

It is a general object of my invention to provide an improved double bowl and cover set wherein the bowls nest together and which is suited to a variety of kitchen uses, such as the raising of yeast dough, wherein the contents of the inner bowl is to be kept at a relatively uniform temperature for a period of time and, at the same time, the contents of the inner bowl is to be kept moist.

Another object of this invention is to provide a double bowl and cover set including nesting bowls and a coacting cover so related in size and shape that space between the outer and inner bowls serves as a water jacket for the inner bowl open at the top between the bowls and the cover confines vapor from the jacket to the interiors of both bowls.

As another object, my present invention contemplates the provision of a double bowl and cover for raising yeast dough and the like, wherein the cover acts as a gauge to determine the proper extent of rise of a predetermined amount of such dough placed within the inner bowl.

Other objects and advantages of the invention will be apparent from the following description and the accompanying drawing in which similar characters of reference indicate similar parts throughout the several views.

Referring to the single sheet of drawings:

Fig. 1 is a perspective view illustrative of a double bowl and cover embodying a preferred form of my invention and wherein the cover is depicted as separated from the bowls and a portion of one of the bowls is cut away to illustrate certain features of the interior construction;

Fig. 2 is a transverse sectional view of the double bowl and cover illustrated in Fig. 1 wherein the parts are assembled and the section is taken substantially on the line 2—2 of Fig. 1; and Fig. 3 is a fragmentary sectional view of a portion of the double bowl and cover shown in Fig. 1 with the parts assembled and the section taken substantially on the line 3—3 of Fig. 1.

Referring generally to the illustrative embodiment of my invention which is depicted in the drawings, the set or combination which comprises my invention includes an outer bowl 10, an inner bowl 12, and a cover 13. It may be readily understood that the bowls 10 and 12 are well suited to separate use and that various combinations of the bowls and cover may be utilized for a variety of purposes. However, the ensemble as depicted is particularly well suited to the raising of yeast dough, such as that used in making bread, biscuits and the like.

Either for separate use of the bowls or for use in its preferred adaptation, the bowls 10 and 12 and the cover 13 may be made of materials such as metal, pottery clay or suitable plastics. For use in the raising of yeast dough, it is desirable that the outer bowl and cover should be opaque to light, so as to prevent the light from slowing down the action of the yeast.

In the past, it has been customary to place yeast dough for raising in a container which was placed in a warm spot and covered with a damp cloth to prevent dust from settling on the dough and to avoid the drying out of the surface so as to form a hardened crust during the raising process. In accordance with my present invention and for use in its preferred adaptation to the raising of yeast dough, the inner bowl 12 is of a size suited to the quantity of dough to be raised, that is, the inner bowl is of a size suited to a certain recipe for the making of a given number of loaves of bread or biscuits. Preferably, the size is such that the predetermined quantity of unraised dough when placed in the inner bowl will not fill the bowl. After raising, that predetermined quantity of dough preferably extends upwardly above the top edge of the bowl.

The outer bowl 10 has a shape which is generally similar or complementary to that of the inner bowl 12 but is sufficiently larger than the inner bowl to provide a space 14 surrounding and beneath the inner bowl which may be utilized as a water jacket. Desirably, this space 14 is so related to the size of the inner bowl and the quantity of dough which is to be raised therein that it will hold warm water in an amount sufficient at a room temperature of approximately 72° Fahrenheit to maintain the temperature of the inner bowl and the dough between limits of approximately 75° to 86° Fahrenheit for a period of approximately one hour. In order initially to warm the inner and outer bowls and the dough contained in the inner bowl, it will be necessary for the water to have an initial temperature of somewhat over 86° Fahrenheit.

In order to provide a desirably uniform spaced relationship between the inner and outer bowls 12 and 10, I have provided, in the present instance, diametrically opposite and laterally projecting tabs 15 adjacent the top edge portion of the inner bowl. Preferably, the top edge portion of the inner bowl is reinforced by an integral circumferential rim 16. The upper edge of the outer bowl 10 is provided with an integral peripherally flanged rim 17 and has diametrically opposite and integrally formed lateral projections 18 which serve as handles for the outer bowl. Inwardly extending recesses 19 in the opposed projecting portions 18 of the outer bowl fit the tabs 15 on the inner bowl positively to locate the inner bowl relative to the outer one.

The cover 13 has a plane edge surface 20 which conforms to and seats against an inwardly extending plane surface 22 on the inner portion of the rim 17 of the outer bowl, so that the cover forms a closure with that outer bowl. Outwardly of the plane surface 22 on the upper edge of the outer bowl 10 is a flanged edge 23 integrally formed thereon to locate the cover laterally of the bowls and to effect a tighter closure between the outer bowl and the cover. Diametrically opposite portions 24 of the cover 13 project laterally and conform to the portions of the lateral projections 18 within the flanged edge 23 thereon, as shown in Fig. 3. Also, the laterally projecting portions 24 on the cover 13 are recessed, as indicated at 25 in Fig. 3, to receive the upper portions of the tabs 15 on the inner bowl.

The cover 13 has a sectional contour such that it extends upwardly from the upper edge of the outer bowl 10 and over the upper edge of the inner bowl 12 in spaced relationship with respect to the inner bowl. The formation of a relatively tight closure between the outer bowl 10 and the cover 13 keeps the contents of the bowls clean and also limits the loss of heat from the contents. With the disclosed spaced relationship between the inner and outer bowls and the spaced relationship between the cover and the upper edge of the inner bowl, water vapor from the space 14 between the bowls may readily pass upwardly between the bowls and between the cover and the inner bowl to moisten the air within the inner bowl. When the inner bowl is utilized as a container for a quantity of dough during the raising process, the vapor from the water in the space 14 keeps the dough moist and prevents the formation of dry crust on its outer surface.

For convenience in removing the cover 13, a centrally disposed handle 26 is desirably provided on its outer surface. The tabs 15 on the inner bowl 12 serve as handles, as do the lateral projections 18 on the outer bowl 10.

For the adaptation of my double bowl and cover combination to the raising of yeast dough, the position and contour of the cover 13 in its relation to the inner bowl 12 are desirably such that when the quantity of dough, to which the inner bowl is particularly suited, has raised to an extent desirable for the making of bread or biscuits having good texture, the dough in its raised condition engages the inner surface of the cover. Thus, with the preferred sizes and relative dispositions of the bowls and cover, the cover serves as a gauge to indicate the proper raised condition of the dough.

Summarizing some of the features of my double bowl and cover combination, particularly in its adaptation to the raising of yeast dough, the inner bowl is of a size and shape suited to the making of a predetermined quantity of bread, biscuits or the like and such that the dough in its proper raised condition swells outwardly toward the cover to an extent such that the cover serves as a gauge to indicate that proper raised condition. The inner and outer bowls nest one within the other and are provided with coacting means uniformly to space the inner bowl from the outer bowl between their sides and bottoms. The spacing between the bowls is effected without the formation of a closure between the two bowls. The open space between the bowls, together with the contour of the cover, provides communication for the passage of moisture from warm water in the space between the bowls to the interior of the inner bowl. The volume of the space between the inner and outer bowls is such that it will hold a quantity of water sufficient to keep the bowls and contained dough between the limits of temperature at which the yeast in the dough is active to effect the raising. The temperature should, of course, be maintained between those limits for a period of time, such as approximately one hour, which is required for the dough to raise a proper or desired amount.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. A double bowl and cover comprising, in combination, an outer bowl having integrally formed handles projecting outwardly from diametrically opposite portions of the top surface thereof, an inner bowl of a shape similar to that of the outer bowl and of a size such that when the top surfaces of the two bowls are substantially flush a space is left between the bottoms and sides of the bowls to provide a water jacket for the inner bowl, said inner bowl having handles projecting outwardly from diametrically opposite sides of the top surface thereof, said outer bowl and its handles having a continuous rim and a contiguous plane surface, said handles of the outer bowl being recessed to receive the handles of the inner bowl within said plane surface to hold the inner and outer bowls in spaced relationship when nested together, and a cover having diametrically opposite portions corresponding to the handles of said inner and outer bowls and a rim shaped to fit and seat against said plane surface of the outer bowl within said rim, and said cover being shaped to provide an open passage between the interiors of the inner and outer bowls over the top of the inner bowl.

2. A double bowl and cover comprising, in combination, an outer bowl having handles projecting outwardly from diametrically opposite portions of the top edge thereof, an inner bowl of a shape similar to that of the outer bowl and of a size such that when the top edges of the two bowls are substantially in the same plane a space is left between the bottoms and sides of the bowls to accommodate a water jacket for the inner bowl, said inner bowl having diametrically opposite tabs projecting outwardly from the upper edge thereof, recesses in the tops of the outer bowl handles wherein the inner bowl tabs are receivable, and a cover arranged to rest upon and cooperate with the top edges of the outer bowl and the handles thereof to close the outer bowl while permitting unrestricted communication between the interiors of the two bowls over the top of the inner bowl.

3. A double bowl and cover as specified in claim 2 wherein the cover is provided with diametrically opposite outwardly projecting handles receivable in the recesses of the outer bowl handles and having recesses wherein the inner bowl tabs are receivable when said tabs and said cover handles are disposed in the recesses of the outer bowl handles.

CLOTILDE D. SWARTOUT.

REFERENCES CITED

The following references are of record in the file of this patent:

UNITED STATES PATENTS

| Number | Name | Date |
|---|---|---|
| 877,675 | Smothers | Jan. 28, 1908 |
| 1,003,112 | Johnson | Sept. 12, 1911 |
| 1,152,308 | Evans | Aug. 31, 1915 |
| 1,347,428 | Wittekind | July 20, 1920 |
| 1,698,914 | Kircher | Jan. 15, 1929 |
| 2,188,543 | Oltman | Jan. 30, 1940 |

FOREIGN PATENTS

| Number | Country | Date |
|---|---|---|
| 345,443 | Great Britain | Mar. 26, 1931 |